No. 808,087. PATENTED DEC. 26, 1905.
F. B. HERZOG, E. P. HOPKINS & C. HERRMANN.
ELECTRIC SIGNALING APPARATUS CIRCUIT.
APPLICATION FILED AUG. 8, 1888.

WITNESSES,

INVENTORS

No. 808,087. PATENTED DEC. 26, 1905.
F. B. HERZOG, E. P. HOPKINS & C. HERRMANN.
ELECTRIC SIGNALING APPARATUS CIRCUIT.
APPLICATION FILED AUG. 8, 1888.

WITNESSES,
INVENTORS
ATTORNEY.

No. 808,087. PATENTED DEC. 26, 1905.
F. B. HERZOG, E. P. HOPKINS & C. HERRMANN.
ELECTRIC SIGNALING APPARATUS CIRCUIT.
APPLICATION FILED AUG. 8, 1888.

WITNESSES,

INVENTORS

No. 808,087. PATENTED DEC. 26, 1905.
F. B. HERZOG, E. P. HOPKINS & C. HERRMANN.
ELECTRIC SIGNALING APPARATUS CIRCUIT.
APPLICATION FILED AUG. 8, 1888.

WITNESSES, INVENTORS

UNITED STATES PATENT OFFICE.

FELIX BENEDICT HERZOG, EDWARD POWELL HOPKINS, AND CHARLES HERRMANN, OF NEW YORK, N. Y.; SAID HERRMANN AND HOPKINS ASSIGNORS TO SAID HERZOG.

ELECTRIC-SIGNALING-APPARATUS CIRCUIT.

No. 808,087.     Specification of Letters Patent.     Patented Dec. 26, 1905.

Application filed August 8, 1888. Serial No. 282,225.

*To all whom it may concern:*

Be it known that we, FELIX BENEDICT HERZOG, a citizen of the United States, EDWARD POWELL HOPKINS, a subject of the Queen of Great Britain, and CHARLES HERRMANN, a citizen of the United States, all residents of New York, in the county of New York and State of New York, have invented certain new and useful Improvements in Electric-Signaling-Apparatus Circuits, of which the following is a specification.

This invention relates to electric-signaling apparatus and circuits generally, and particularly to apparatus used for the purpose of electric signaling in connection with various appliances invented by F. Benedict Herzog, for which a number of patents have been issued to him and for which a number of applications by him solely and jointly with others are pending. Among the patents above mentioned are Nos. 289,834 and 315,027, and among the applications mentioned are No. 158,530, of March 12, 1885; No. 277,695, of June 20, 1888; No. 248,363, of August 31, 1887, and No. 248,897, of September 5, 1887.

Fig. 2' shows a sectional side view of the "local alarm," and Fig. 2" shows the parts when protecting-plate $m''$ is removed.

The apparatus is contained in a box designed to be placed on the street and includes means for sending variable signals for "communication," means for sending various kinds of alarms, means for receiving variable communication-signals sent from another station, means for receiving alarms other than communication-signals, and also means for receiving signals from auxiliary or "sub" stations.

Figures 3, 4:
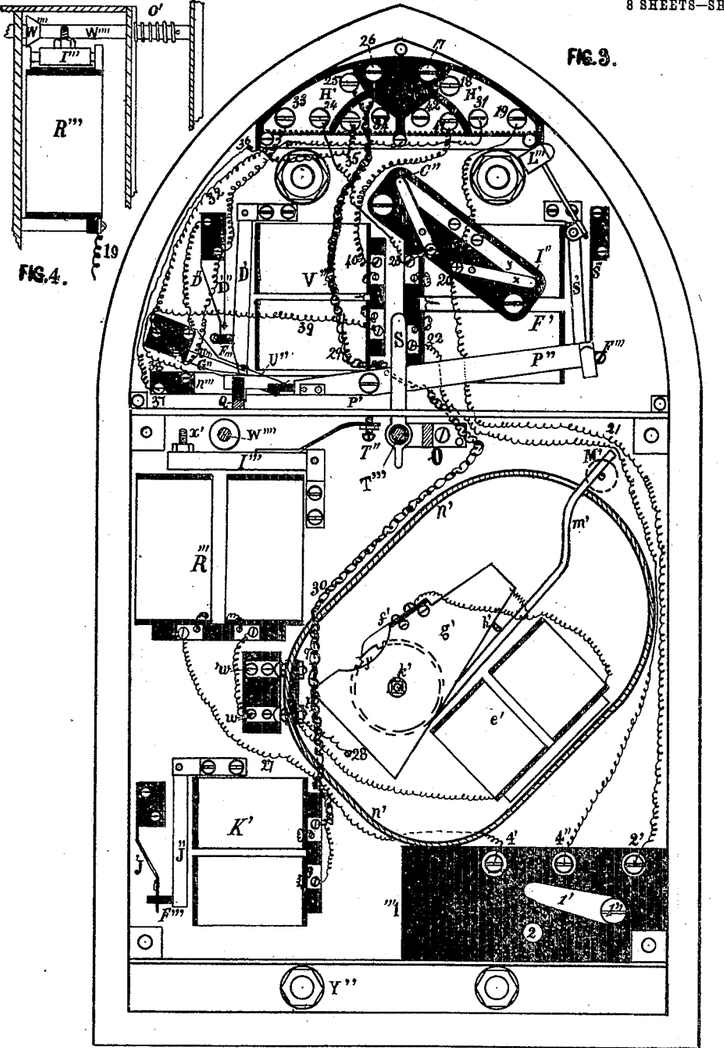
Fig. 3 shows the mechanism when the large instrument and the protecting-plate shown in Fig. 7 are removed.
Figs. 4, 5, and 6 show details of the apparatus.
Figure 7:
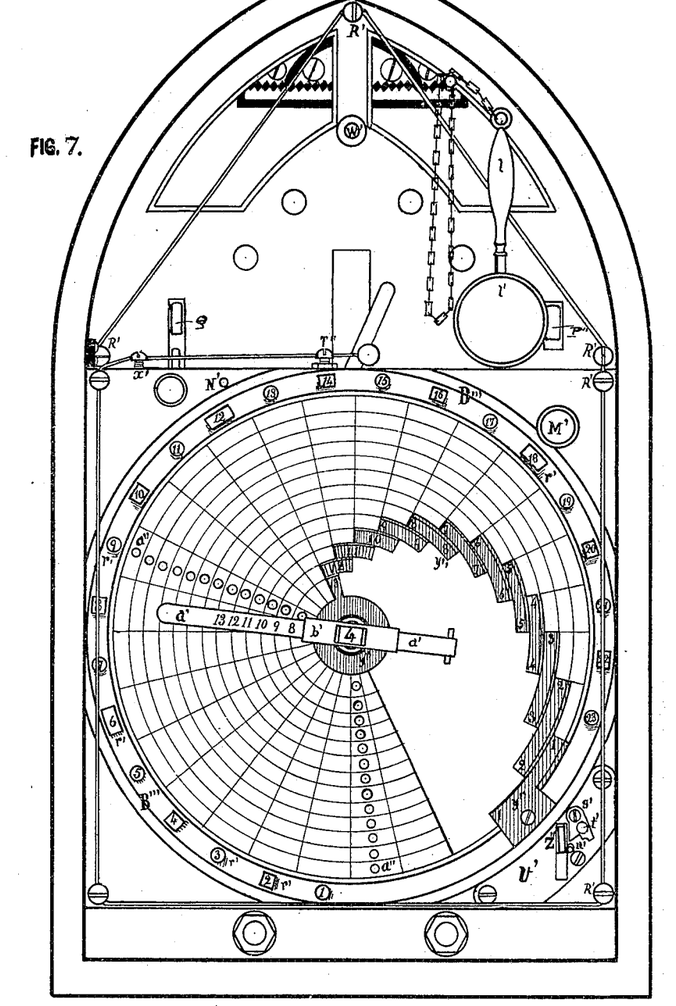
Fig. 7 shows what is seen when the door of Fig. 2 is opened.

The signal-transmitter consists generally of any suitable transmitter—for instance, of what is known as the "sliding-arm," latent-signal, shown in other pending applications of Herzog alone, or with others—as, for instance, Serial No. 158,530, of March 25, 1885. Generally speaking, however, the transmitter comprises a clockwork which carries a break-wheel bearing a number of teeth, all but one (which is larger) being of the same size. This clockwork coöperates with the spring and when wound is prevented from running down by the obstruction offered by the armature of a magnet when in its normal position; but when energized from a distant coöperating station the magnet permits the clockwork to revolve the wheel, ($g'$, Fig. 3,) thus breaking the circuit whenever a space comes opposite coöperating brush $f'$. The central wheel-supporting arbor comes through the front dial-plate, as seen in Fig. 7, and is fixed to a sleeve $b'$, within which slides a bar $a'$, carrying a downwardly-extending pin. (Not shown.) This pin will in the course of its revolution engage with one of the various radial steps of the "rib" $y''$, the particular step depending upon the position in which the arm is placed in its sleeve $b'$. As the wheel revolves, the large tooth mentioned will break up the regular sequence of equal impulses by a distinguishably longer closure and thereafter additional impulses will be transmitted by the teeth following the large tooth until the apparatus comes to rest finally in one of several positions as determined by the original location of the arm in its sleeve. The arm and pin also coöperate with the dial, and the arm is therefore usually called the "pointer." The novel features of this transmitter to be herein described are, first, that the signaling apparatus is contained in an inner box the edges of which are seen in elevation, as $n'$, Fig. 3, and this box is rigidly fastened to a supporting back plate, which plate is clamped to the square casting, the front of which is seen as $v'$ in Fig. 7, and which is attached to the outer box by means of the screws R', which enter into holes, as indicated in Fig. 3. Projecting from the side of the inner box is the proper number of contacts, which coöperate with flexible contact-springs $w$ $w'$, (seen directly under magnet $R'''$.) The act of screwing the frame $v'$ into place thus automatically makes the necessary contacts. Secondly, whenever the pointer has been turned too far to the right by the operator in selecting the signal to be sent he can turn it back again by pressing on the button M′, Fig. 7, and thereby causing the end of a pin to scrape against the armature extension, as shown in Fig. 3, thereby freeing the escapement and permitting the movement to unwind until he stops depressing M′, whereupon by means of the retractile spring shown or its weight the armature falls back to its original position. Thirdly, the front casting has a circular hole, permitting the display of a dial, (shown in Fig. 7 as a number of squares supposed to bear printed words,) and at proper distances along the edge suitably shaped and arranged projections or depressions are placed, preferably cast integrally with the same. In the present instance these are shown as round projections for the columns bearing odd numbers, square projections for the even numbers, and oblong projections for certain selected numbers. Moreover, the rib $y''$ has cast upon it or otherwise suitably marked a number corresponding to the number of the circle in which the pin was placed before it ran back to zero. On the pointer-arm are suitable marks indicating some or all of the positions in which the pointer may be placed in such manner that these indications may be noted at either end of the sleeve $b'$ or through the window seen therein.

"*Notification*" *call.*—The transmitter just described or any other suitable transmitter may be set at the box, so as to be ready to transmit its signal, and is caused to operate from a distant station, and in order to let this station know that the transmitter has been set to some signal provision is made for sending one or more recognizable impulses, called the "notification-signal." This is given by the switch-lever 1′ of Fig. 3, fulcrumed at 1″ and connected by a suitably-pivoted link (not shown) to an external hook Z″, protruding through the hole in the front casting. The depression of this causes the circuit to be as follows: Entering on top of the box at pin 17, it passes into the lightning-arrester 18 H′ 19 20 21 to binding-post 2′, switch-lever 1′, contact 2, (when switch is depressed,) thence to binding-post 4, up again to screw 22 of magnet F′, through the magnet to screw 23, thence back to binding-post 24 25, and out at 26. If desired, instead of passing directly from 25 to 26 through a connection, preferably a piece of fusible wire, such as is indicated by the white line between 17 and 18, it can be made to pass into the magnet K′, situated at the lower left-hand corner of Fig. 3, and thence back again through the double cord, as shown, and out to 26. This course will produce an effect that whenever the "notification-switch" is operated the magnet K′, operating as a sounder-magnet, will cause a loud tap, thus indicating that the circuits are in good shape. In the present case of a notification-signal this would be unnecessary, as the sounder F′ is inserted when the notification-signal is given, and consequently the two magnets F′ and K′ will tap simultaneously; but in the case of the other alarms, which will be described farther on, it is very important that a loud tap be heard to indicate that everything is in correct order.

Figure 1:
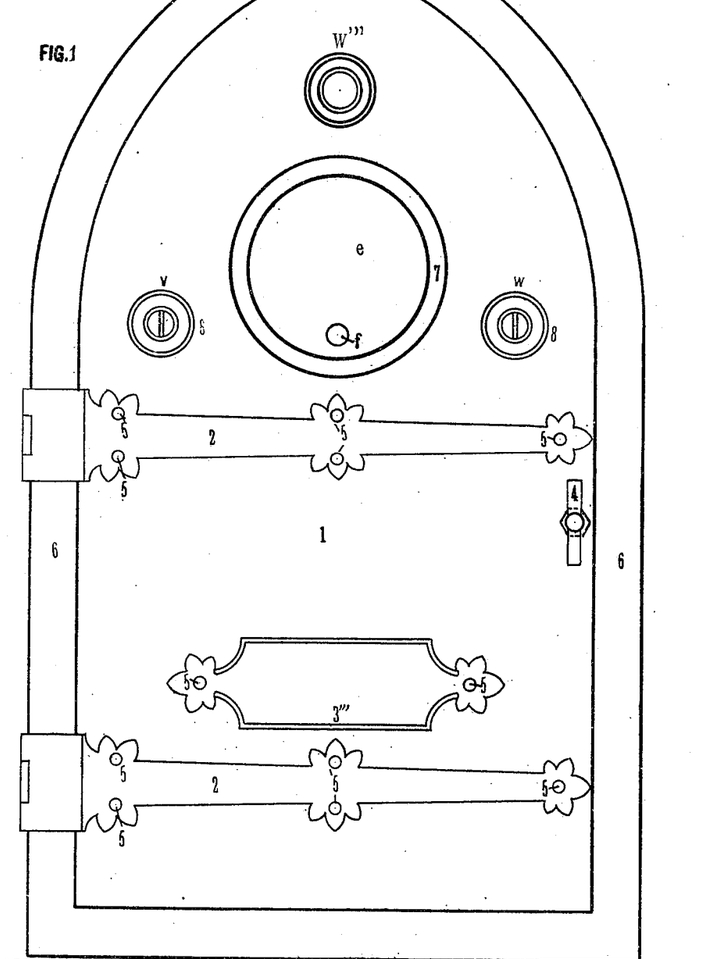
Figure 1 shows the front view of a box embodying the invention and, as here shown, as applied to municipal signaling.
Figure 2:
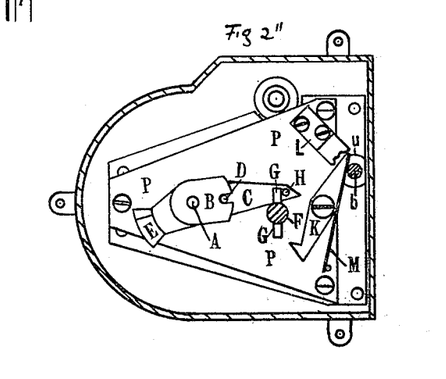
Fig. 2 shows the inside of the door with some details of mechanism fastened thereto.
Figure 9:
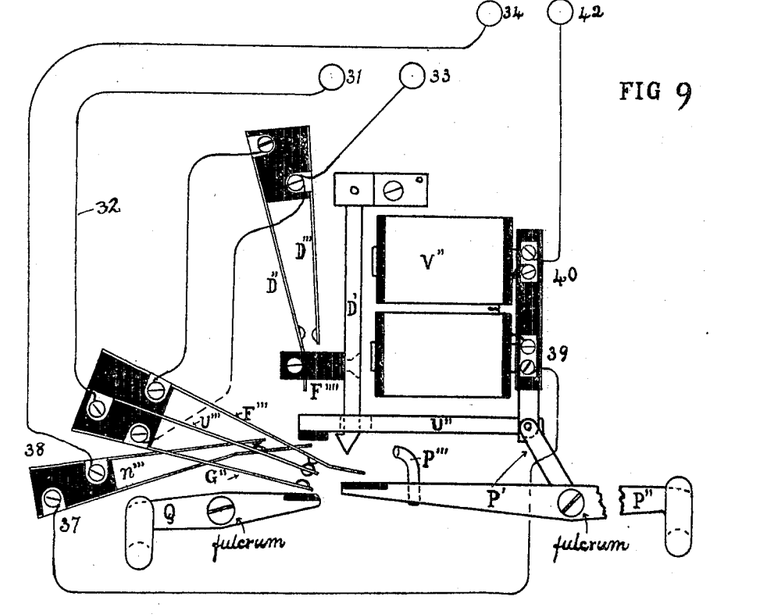
Fig. 9 shows in detail the circuits and arrangements for "substation calls" shown in the upper part of Fig. 3.

The "emergency-alarms" are special calls caused by closing the circuit through less resistance than was the case with the notification call, and thus producing a recognizably-different effect at the receiving-station. These may be transmitted in four ways—first, in Fig. 7, Q is the handle of a lever properly fulcrumed, which when depressed causes its other end (represented in section as Q, Fig. 3) to rise and as it rises to cause spring G″ to come in contact with spring U‴, thus closing the circuit as follows: binding-post 17, fusible wire, post 18, post 31, wire 32, spring U‴, spring G″, wire to 33, post 25, through the double cord to sounder-magnet K′, and out by 26, thus establishing the same circuit as in the case of the notification call, with the exception that the magnet F′ and its immediate connections are cut out. Secondly, by turning a key in the left-hand lock $v$, (shown in Fig. 1,) the inside of which is shown on the right-hand side of Fig. 2 as $m$, the bolt of which lock operates the sliding piece $n$, with its projections $o$, and this projection is so arranged as mechanically to depress the lever Q, Fig. 5, just as it is done by the hand of the operator when the box is opened. Within the lock there is a spring strong enough to lift up the lug $o$, so that the lever Q does not remain depressed all the time the key is kept within the lock. This emergency call can be given in a third manner by the local alarm. The circle in the center of the upper portion of Fig. 1 is the front of the local alarm, whose function it is to cause a gong within the box to give a preliminary local alarm whenever this apparatus is utilized by persons who have no key for the purpose of transmitting an alarm to the receiving-station. Some portion of this mechanism is shown in Fig. 2 and will be hereinafter described. The function of the apparatus as a whole is to cause from the outside of the box the closure of a circuit at each end of strip $y$ on rubber block I″, Fig. 3. One end is closed by the pushing forward of W′, Fig. 2. The other end is closed by pushing forward W‴. When these two closures are made in a manner to be described hereinafter, the circuit is as follows: 17, fusible strip, 18, 19, 20, $x$, $y$, C″, 23, 24, 25, double cord, through K′ back to 26, and out, being, as will be seen, an alternative manner of sending this emergency-alarm. Fourthly, by closure of the "local"

circuit at a sub or auxiliary station, which energizes the magnet V″, which attracts its armature D′, causing a closure between the two springs D″ D‴, whereupon the main circuit is established as follows: lightning-arrester block 17, fusible wire 18, 31, around to triple-spring block, central spring U‴, normally closed contact F‴, contact-block D″ and D‴, 33, 25, double cord, through K′, 26, and out, as before. If it is desired to have at this subsidiary station not merely means for sending a single impulse by a simple closure, but also means for sending one or one of a number of characteristic signals, this is accomplished by using at the distant station an instrument of the class known as "latent-signal" transmitters, in which case in order to prevent the premature release of this transmitter on the closure of this circuit, as well as for the purpose of avoiding crosses, it is desirable to cause the automatic break of the local or subsidiary circuit before the release of the instrument and if an easily-polarized battery is used within a very short period after this closure, thus also serving to make the closure through the magnet V″ temporary; but, unless desired, this closure through magnet V″ need not be temporary only, in which case and without any further mechanism the fact that the closure continues is perceptible at the central station and serves to distinguish the substation emergency call from that given in any other manner thus far described, as in all of these the alarm sounds only until it is stopped at the central station. The substation-circuit enters lightning-arrester at 34, thence goes into contact-block 35, through the two contacts to the contact-screw of the magnet V″, through that to 40, thence to 41, and out. Fig. 9 shows the details of this portion fully, there being, however, in order to make the drawing more clear, some distortion, in that in the description in connection with Fig. 3 the fulcrum or pivot upon which the restoring-arm P″ works is shown in perspective, and a lug P‴ is added to represent a slight enlargement or projection which permits the rocking of P″ to carry upward with it the armature-supported drop-bar U″. At the first closure the attraction of the armature D′ by magnet V″, while it closes the contact D″ and D‴ by means of some suitable device, such as the insulated hook F″″, and transmits the alarm, also loosens the bar U″, fulcrumed at P′, and, normally supported by a nick, lug, or tooth at the end of armature D′, causes this to drop upon the lower spring n‴, thus rupturing the circuit at that point. This continues to be the state of affairs until some one comes to the box and by depressing the lever P″ on the right hand in Fig. 5 causes the other end of this lever P″, fulcrumed at P′, to rise up and in close succession to first break the main alarm-circuit by lifting a long projecting end of the spring F‴ (the uppermost of the three-spring combination) and immediately thereafter and by a continuance of the same motion raising the hinged bar U″ until this is caught by the nick at the end of the armature D′ and held there, and thus restored to its normal position, whereupon the two springs of the n‴ combination being relieved of this weight reëstablish the local circuit. It will be seen that in this, as in several other magnets of this box, one of the contact-springs operated by the armature of these magnets also serves as a retractile spring. In the case of this alarm, as in the case of the others already shown, the sounder-magnet K′ is in circuit. If there is only one substation and only one signal is to be sent therefrom, there is no need of differentiating between the signal which may be received from the substation; but if there are several boxes or several signals to be sent from each this is necessary. A convenient way of doing this is to use at the substation a signaling instrument capable of sending a characteristic signal invariable for each station and in addition thereto a variable signal to indicate which one of several signals is sent from a particular station. Mechanism for doing this is elsewhere shown. The preferable way is to cause two series of impulses, one of them—say the first—showing the station, then a pause, and then the second series of impulses, the number of which varies according to some prearranged system. The sliding-arm transmitter hereinbefore described may be used for this purpose by fastening the sliding arm in a different position for each different station, thus giving a different number of impulses for every such station, and then a variable signal may be given by varying the degree of rotation of the pointer with respect to the columns on the coöperating dials. (Shown in Fig. 7.) The release or operation of this latent-signal instrument will show the substation operator at his box that his signal has received attention. The impulses thus given will be easily noted by the operation of the sounder K′, the interval between the two sequences of impulses being a pause caused by the large tooth described in connection with the transmitter of the box. By placing and organizing the contact-springs n‴, U‴, G″, and the rubber at the end of the lever P″, so that the break in the alarm-circuit precedes the motion of the armature D′, all danger of causing additional closures of the alarm-circuit is avoided.

The signal-receiver consists of the sounder F′, which has for a retractile spring the leaf-spring S‴, which spring is so made and placed that for certain connections other than those here shown and which form no part of this invention it may be made to coöperate with a suitable contact insulated from the spring. This sounder is fitted with an adjustable hammer, which by striking against the side of the box makes a sufficiently-loud noise.

Figures 5, 6:
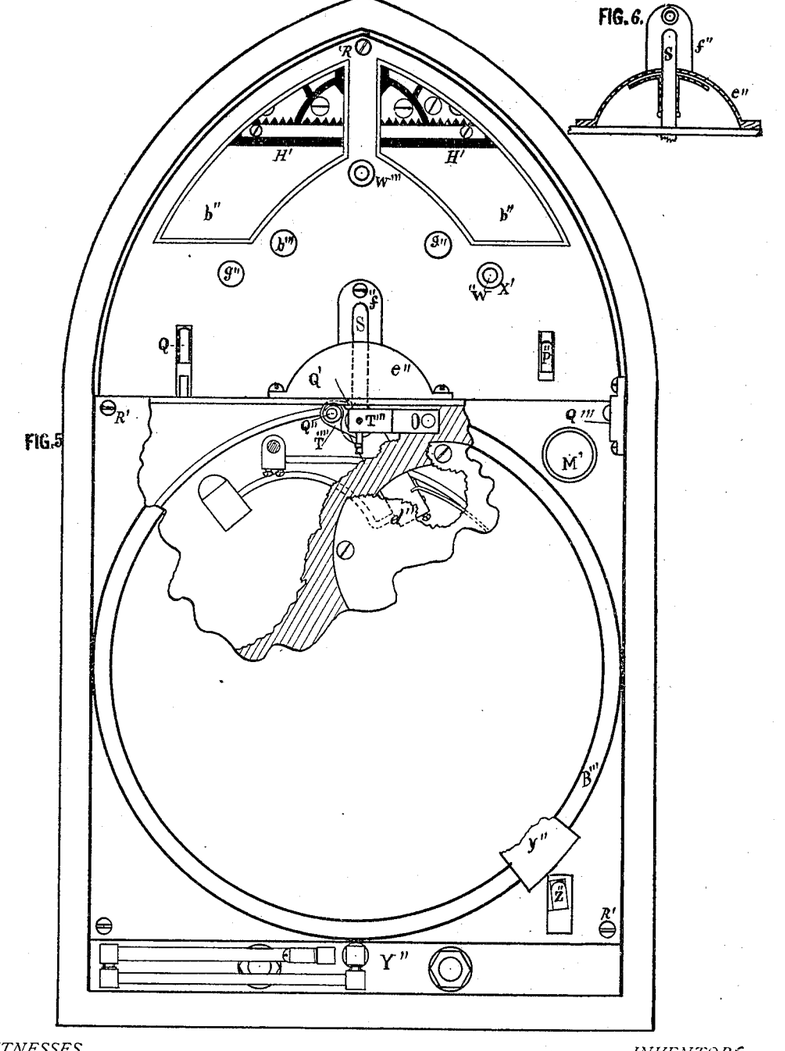

The alarm-receiver consists of a large gong placed in the rear of the box, the edge thereof being partly shown in Fig. 5 in position to be struck by its hammer, which is separated from the front by a diaphragm so closely fitted that it is dust-proof with relation to the rear portion of the box. In Fig. 5, $d''$ represents a cover-plate to be fixed onto the diaphragm-plate, which covers half the box underneath the horizontal partition and the corners of which are notched, so as to touch the sides of the corner-posts. (Shown in Fig. 3.) The object of this plate $d''$ is to permit adjustment of the two gong-hammers, which operate the gong, placed behind this partition. One of these hammers is fastened to the armature-trunnion of magnet $R'''$ of Fig. 3, and the second is a part of the local alarm, referred to above and described below. Among the improvements on this part are that, in the first place, both the retractile springs and the back-stop are fastened directly to the armature, which we consider of great importance, not merely in this combination, but in many others of a similar nature, and they both abut upon the horizontal partition without requiring any adjustment of this partition. In the next place, in order to prevent the gong, which is within the box, from sounding too loudly whenever the door of the box is opened, and whenever a man is at the box, when there is no necessity for calling his attention, as he is already there, we use the following mechanical device in preference to an electrical device for the same purpose. A pressure-rod $W''''$ moves in a small tube, preferably cast integrally with the plate which supports the signaling instrument proper, or, if desired, merely moves within the two holes in the diaphragm, and in that plate, in Fig. 7, and has at its other end a feather provided with a wedge or a conical piece, as shown in Fig. 4, and by means of a small cylindrical spring $O'$ is caused to move into position, where this conical piece will scrape along the upper edge of the armature $I'''$ sufficiently to prevent it from going back to a position which it could reach if only restrained by its back-contact adjustment. The pressure exerted by the door when closed moves this presser-rod aside, thus allowing free operation of the gong when the door is closed, but muffling the same while the door is opened. This may be adjusted so as to give precisely the desired degree of loudness when an operator is at the open box without interfering in any way with the maximum sound of the gong when this is to be used for the purpose of attracting the attention of a policeman or other operator who may be at a distance, and this without any delicate adjustments, changes of battery, &c.

Figure 10:
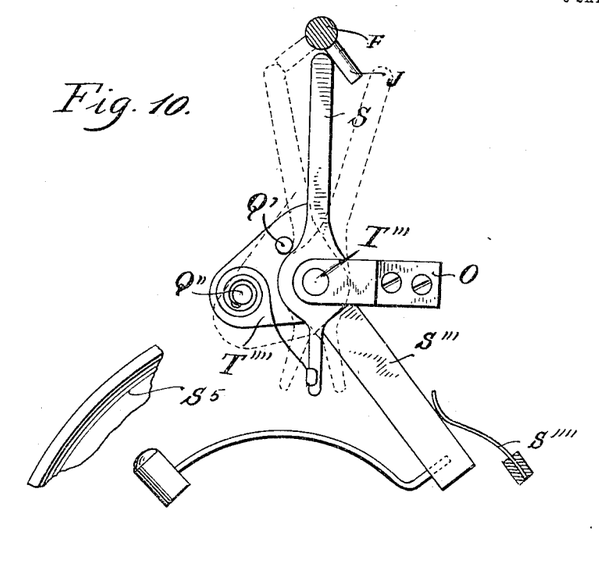
Figs. 10, 11 show, respectively, sectional elevation and plan of the main part of the local alarm.
Figure 11:
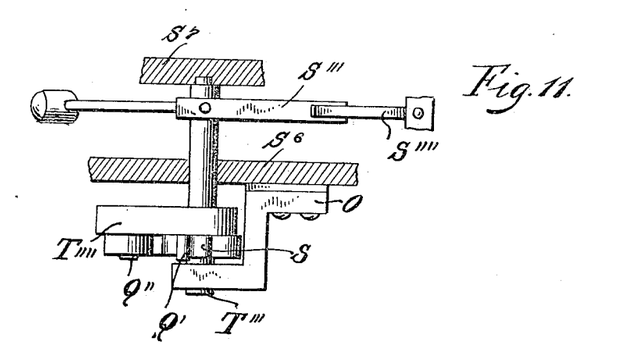

The local alarm is shown in fullest detail in Figs. 10, 11. The general object of this, which has been before referred to, comprises in coöperation with the gong before described and its electrically-operated hammer a second mechanically-operated hammer, which is fastened to the spindle $T'''$ of Fig. 3 on the inner side of the diaphragm $S^6$. It also comprises the following parts, designed to enable the rotation in one direction of the wheel $e$ of Fig. 1 (by persons desiring to operate the local alarm) to cause the gong to sound, while its rotation in the reverse direction by the unwinding of the spring may be accomplished easily and noiselessly. On the outer side of this diaphragm on the spindle $T'''$ is rigidly fastened a block $T''''$, from which projects a pin $Q'$ and a second pin $Q''$. Around the pin $Q''$ is twisted a leaf-spring, the end of which terminates in a claw, engaging the lower end of lever S in such fashion that whenever the upper end of the lever has moved to the right the elasticity of the spring will be utilized to throw the lever back to its vertical position, and as it does so the claw slides up and down the side edge of the lever. Whenever the upper end of the lever is turned to the left, it presses against the pin $Q'$ in such fashion that the block $T''''$, which is rigidly fastened to the spindle $T'''$, with it and block $S'''$, also fixed to the spindle on the other side of the diaphragm $S^6$, turns to the right, putting spring $S''''$ under tension, so that when J has carried S to the point where it becomes free the rigid combination of $Q''$ and $S'''$, both carried by spindle $T'''$, will be operated by the recoil of spring $S''''$ to cause the hammer to strike the gong whose edge is shown as $S^5$. Every time that the handle $f$ of Fig. 1 is turned to the right the feather J, Fig. 2, on the spindle F also turns to the right, as these are rigidly mounted to the disk which carries the knob $f$, and as these move to the right at each turn the feather J presses the lever S to the right until it passes it, and thus at each turn the gong gives one tap. Moreover, by the gearing the piece B on the spindle A, Fig. 2'', continues to revolve, carrying with it, indirectly through pin D, the piece C, loosely pivoted on the spindle A, until the maximum revolution permitted by the combination has caused the pointed end of C to press aside the dog K and be caught by the point of this dog as this is pressed forward by the resiliency of the spring M. The edges of C and of K are properly sloped to permit of the gradual pushing aside of K until after the extreme point of C has passed the pointed hook on K and is caught thereby. At the same time the beveled end E turns round and raises the spring-plug $W'$ (seen in Fig. 2) until this projects out from the surface of the box-cover $m''$ and causes the closure between $x\ y$ on insulated block $I''$, Fig. 3. When this has been done, pressure on the push-button $W'''$ in the front of the box will directly cause the closure at the other end of the strip $y$ of Fig. 3, thus causing the double closure before alluded to. The moment the box is opened the presser-rod $b$, Figs. 2 and 2", is relieved from the confinement caused by the lug $b'''$ of Fig. 5, and as it shoots out, owing to a small spring placed around it, a conical ring causes the upper end of the dog K to turn to the left, and thus to release the piece C, which, by means of a clockwork-spring within the box, thus returns to its normal position. The object of causing the piece C to move through the pin D is to permit of a slight amount of play, so that no backlash of the movement or jerks on the handle F can cause interruption of the contact on $x\,y$ of Fig. 3.

In Figs. 5 and 6 a device is shown to permit the lateral play of the lever S without leaving an opening through which foreign objects can be dropped into the mechanism. A semicircular box $e''$ is provided with a slot properly shaped to permit of the free operation of S, and attachably secured to S is an inner cover which, working behind and coincident with the slot, which is not shown, prevents anything being dropped in. Fig. 6 shows these parts in sectional elevation. These figures also show means to cover the hole, which is preferably left within the upper projecting plate of Fig. 5 to enable this to be put into its place behind lever without taking out the lever S whenever inspection is necessary. This is done by having a projection cast upon the semicircular box $e''$, as $f''$, and, if desired, an additional screw may hold this in place.

Figure 8:
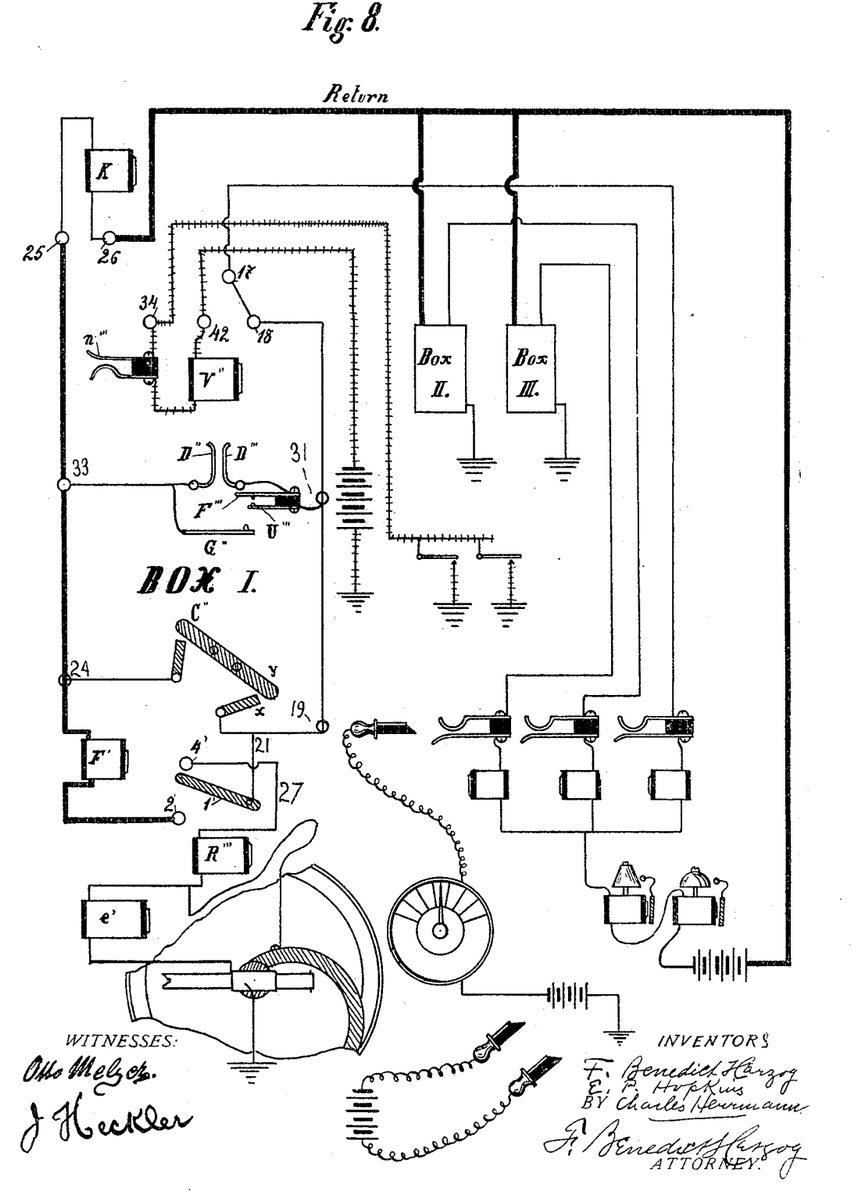
Fig. 8 is a theoretical diagram of circuits including those to the distant station.

Among other features to be noted are that the windows, through which the lightning-arrester is seen in Fig. 7, are preferably covered with glass or mica. $W'''$ and $W''$, Fig. 5, are shown as working in tubes, which are made by properly boring out lugs cast with this plate. Fig. 7 shows how a cord is passed through holes pierced in the screws, which hold on the lower and upper plates, and how a seal can be fastened at the end, thus preventing access to the mechanism without breakage of the seal. Fig. 7 also shows a magnifying-glass within the box. In the lower part of Figs. 3, 7, and 5 will be seen a recess extending back into the box, thus taking up a place which extends the depth of the gong and the movement-box and is used for the purpose of placing code or direction books, tools, &c, lamp or candle, or, as shown in Fig. 5, an adjustable gas burner and bracket to be attached directly to the gas-pipe in case the box is mounted on a post within which there is a feed-pipe. $Q'''$ is a lug screwed to the inside of the box and serves to retain the bolt of the lock, and this manner of doing this is preferred to any recess which could be made in the casting itself. The door is made so as to fit closely. The flange shown in Figs. 1 and 2 is shown as wider than in the other figures which represent the edge of the box, and is intended to represent a proper degree of curvature by which the rounded bead, shown in the other figures as the box edge, is embraced, thus insuring a thoroughly good dust-proof fit. In Fig. 7, in the lower corner, will be seen a small lever fulcrumed at $s'$, movable by means of the knob $t'$ and nicked in such fashion that when the notification-lever $D''$ is depressed and this auxiliary lever pushed to the left it acts as a back-stop and prevents the return of the lever to its original position, where it is permitted to make back contact, as shown in Fig. 3. This is used in cases where it is desired to operate the lower contact at a telegraph-key without forming any back contact, as shown in Fig. 8, where provision is made whereby two boxes may be connected together through the central station. The piece of rubber on armature of magnet $K'$, Fig. 3, is notched at the rear end, thus permitting the spring $J'$ to play within it while it is insulated from the armature $J''$. This arrangement is very convenient, as in case of trouble of various kinds the magnet may be pulled out with a minimum disarrangement of the contact.

The ironwork of the box consists of the casting comprising a lower partition, forming a recess, already described, and in addition to this a second parallel division is cast near the upper end of the box; but this only extends outward as high as the gong behind and is made complete by the insertion of a detachable plate, (shown in Fig. 3,) within which a slot permits the lever $S'$ to be placed before this is inserted. Upon the front side of the back of the upper portion of the box is placed an insulating-plate, (see Fig. 3,) pierced with two holes large enough to admit of a wrench to be used in screwing up the nuts placed on the ends of a U-shaped piece of iron encircling the lamp-post or other support upon which the box is placed. The parts of the upper part of the box are protected by the plate, (see Fig. 5,) and this is placed so far back that when the door is closed there is ample space for the casing around the local alarm on the door. On the door is a small candle-lamp mounted on a toggle-joint, so that it may be put in place. This comprises a cylinder containing a spring and serving to keep the end of an inserted candle at a fixed position opposite a reflecting device, as is well known in so-called "student-lamps." The lamp-cylinder is slotted vertically, thus permitting insertion of a match to light the candle, while the front is covered with glass to protect it from the wind.

Fig. 8 is a diagram of the circuits. Three street-boxes are shown and one of them in detail. The heavy line shows the common return to the distant central office. The circuits comprise this return and an individual wire to each box and, furthermore, a ground connection to each box, the magnet K shown looped in, as described. The central-office battery and an annunciator are brought into operation from any box whenever the closure is made between D″ and D‴ or between G″ and U‴ or at the double local-alarm break C″ y x or by lever 1′ and 2, which last is the only connection in which the resistance of the sounder-magnet F′ is included. In these closure combinations U‴ and 1′ both break their normal connections. In the latter case this connection is to gong-magnet R‴ and then to ground, either directly through the transmitter-rib, which is insulated from the transmitter itself, except when it is touched by the arm, or else when the transmitter is set and the pointer does not touch the rib, then also through the transmitter-magnet e′. The result of this is that e′ is cut out when the transmitter has been released and is in circuit when it is set, and the resistances of these magnets and adjustment of parts is such with relation to the normal current that the gong-magnet will not operate until after the transmitter has been caused to run down. The D″ D‴ combination is closed by action of the magnet V″, operated from the substation. The G″ U‴ combination is closed by the manual lever Q or by the key turning in the lock on the door. Circuit 102 shows the substation system comprising suitable means for energizing magnet V″.

The central station comprises practically the system shown in Herzog's patent of April 7, 1885, with a substitution of a ground for the second return-circuit and with the addition of a second bell, preferably of different tone, and wound and adjusted, so that it does not respond to the weaker current of the notification due to the retention in circuit of magnet F′.

104 is a combination of a suitable battery with two plugs arranged so that any two lines can be switched together, so that they may telegraph to each other with their levers 1′ on the lower contact 2.

We claim—

1. In a street signal-box, means for controlling the main circuit to a receiving-station by an operator at the box; adjuncts at the box for also controlling the main circuit from a substation, together with one or more points of connection to the main circuit adapted and arranged to be used with the said adjuncts and for the substation-control only; and a substation-line entirely distinct from the main line.

2. In a street signal-box, means for controlling the main circuit to a receiving-station by an operator at the box; adjuncts at the box for also controlling the main circuit from a substation, the first-named controlling means being arranged so that the circuit-controller may be controlled from the outside of the box, when closed, by means of a key, without opening the box.

3. In a street signal-box, means for controlling the main circuit to a receiving-station by an operator at the box; adjuncts at the box for also controlling the main circuit from a substation; a substation-line entirely distinct from the main line and a circuit-controller at the box arranged to react upon the substation-line.

4. In a street signal-box, means for controlling the main circuit to a receiving-station by an operator at the box; adjuncts at the box for also controlling the main circuit from a substation; a substation-line entirely distinct from the main line; a circuit-controller arranged to react upon the substation-line; and devices set in operation by the actuation from the substation and operating to control the substation-circuit.

5. In a street signal-box, means for controlling the main circuit to a receiving-station by an operator at the box; adjuncts at the box for also controlling the main circuit from a substation; a substation-line entirely distinct from the main line; a circuit-controller for the substation-line; devices operating to control the substation-circuit; and means acting to continue this control until the conditions are restored; and a means normally preventing access to a restoring device together with a restoring device, arranged to restore the parts to their normal condition.

6. A street signal-box, combining means for controlling the main circuit to a receiving-station by an operator at the box; adjuncts at the box for also controlling the main circuit from a substation; and a substation-line entirely distinct from the main line; a circuit-breaker in the substation-line; adjustments whereby the control of the main circuit and the break of the subcircuit are produced through a magnet in the box; together with a restorer manually controlled and controlling both the resetting of the main-station controller and the reëstablishment of the broken substation-line at one operation.

7. In a street signal-box, a main-line controller, terminals to circuit connections from a substation and a substation-line entirely distinct from the main line; a magnet in circuit with such terminals and operating simultaneously to control the main circuit and break the substation-line and a restorer directly controlling the substation-terminal and the main-line controller.

8. In a street signal-box, normally open circuit-terminals to a main line leading to a distant station; an electromagnet-controlling means for controlling the same so as to affect receiving apparatus at said station; a substation-line entirely distinct from the main line which leads to the distant station; together with normally closed terminals to the substation-line and means for breaking these during the same operation that closes the main-line circuit.

9. In a street signal-box, a controller for a main circuit to a receiving-station; means for operating the same at the box; adjuncts at the box for controlling the main circuit from one of several substations; a substation-line entirely distinct from the main line; and, at the box, means for indicating which substation has operated.

10. In a street signal-box a controller for a main circuit to a receiving-station; means for operating same at the box; adjuncts at the box for controlling the main circuit from one of several substations; a substation-line entirely distinct from the main line; and at the box means for indicating which substation has operated and for indicating the special one of several variable signals set at the indicated substation.

11. In a signal-box system, means for controlling the main circuit to a receiving-station by an operator at a main box; means normally adapted and adjusted for also controlling this main circuit from a substation; and a substation-line entirely distinct from the main line, and means adapted and arranged to act, after operation from the substation, to change the normal circuit adjustments of the system to abnormal circuit adjustments; together with means adapted to cause these abnormal circuit adjustments to continue indefinitely until they are restored by the operation of devices which are not controllable from the substation.

12. In a signal-box system, means for controlling the main circuit to a receiving-station by an operator at a main box; means normally adapted and adjusted for also controlling this main circuit from a substation through an entirely-distinct substation-line; and means adapted and arranged to act, after operation from the substation, to change the normal circuit adjustments of the substation-line to abnormal circuit adjustments; together with means adapted to cause these abnormal adjustments to continue indefinitely until they are restored by the operation at the box of devices which are not controllable from the substation.

13. In a signal-box system, means for controlling the main circuit to a receiving-station by an operator at a main box; means including a magnet and its armature, normally adapted and adjusted for also controlling this main circuit from a substation through an entirely-distinct substation-line; and means, including circuit-controlling devices arranged to be actuated by the said magnet in the subline, adapted and arranged to act, after operation from the substation, to change the normal circuit adjustments of the substation-line to abnormal circuit adjustments; together with means adapted to cause these abnormal adjustments to continue indefinitely until they are restored by the operation of devices which are not controllable from the substation.

14. In a signal-box system, means for controlling the main circuit to a receiving-station by an operator at a main box; means adapted and adjusted for also controlling this main circuit from a substation; a substation-line entirely distinct from the main circuit, and means adapted and arranged to act automatically, after operation from the substation, to produce an electrical effect perceptible at the substation, whereby the substation-operator is assured that his apparatus has operated; together with devices adapted to be actuated by an operator at the main box and arranged to restore the normal conditions, at the box, of the substation-line, and to produce an electrical effect perceptible at the substation, whereby the substation-operator is assured that his signal has received attention.

15. In a street signal-box, means for controlling the main circuit to a receiving-station by an operator at the box; a magnet and adjuncts at the box for also controlling the main circuit from a substation; a substation-line entirely distinct from the main circuit, a circuit-breaker at the box and in the substation-line; and devices set in operation by the actuation of the magnet from the substation and operating to cause the circuit-breaker to break the substation-circuit; said means being arranged and adapted to coöperate with a number of substations and when set in operation as the result of action from one of these, to prevent the further operation of the others.

16. In a street signal-box, means for controlling the main circuit to a receiving-station by an operator at the box; a magnet and adjuncts within the box for also controlling the main circuit from a substation; a substation-line entirely distinct from the main circuit; a circuit-breaker in the substation-line; devices set in operation through the magnet and operating to cause the circuit-breaker to break the substation-circuit; a restoring device arranged and adapted to be actuated by an operator at the box; and means acting to continue this break until restored by the restoring device; said devices being arranged and adapted to coöperate with a number of substations and when set in operation as the result of action from one of these, to prevent the further operation of the others.

Signed at New York, in the county of New York and State of New York.
F. BENEDICT HERZOG.
EDWARD POWELL HOPKINS.
CH. HERRMANN.
Witnesses:
CHAS. E. ANDERSON,
PHILIP HERZOG.